United States Patent [19]

Nakamura et al.

[11] Patent Number: 5,547,409
[45] Date of Patent: Aug. 20, 1996

[54] MANUFACTURING METHOD OF PICTURE TUBE

[75] Inventors: Koji Nakamura; Tetsushin Yazu, both of Nagaokakyo, Japan

[73] Assignee: Mitsubishi Denki Kabushiki Kaisha, Tokyo, Japan

[21] Appl. No.: 330,735

[22] Filed: Oct. 28, 1994

[30] Foreign Application Priority Data

Dec. 28, 1993 [JP] Japan ..................... 5-335383

[51] Int. Cl.⁶ .................................................. H01J 9/24
[52] U.S. Cl. .................................................. 445/8; 65/115
[58] Field of Search ........................... 445/8, 45; 65/115

[56] References Cited

U.S. PATENT DOCUMENTS

| | | | |
|---|---|---|---|
| 2,329,057 | 9/1943 | Kiehl | 65/115 X |
| 2,956,373 | 10/1960 | Earhart | 65/115 |
| 2,991,591 | 7/1961 | Gabor et al. | 65/115 |
| 3,445,316 | 5/1969 | Megles | 65/115 X |
| 4,000,997 | 1/1977 | Rogers | 65/115 X |
| 4,498,884 | 2/1985 | Stover et al. | 455/45 |
| 4,566,893 | 1/1986 | Hopkins et al. | |
| 4,950,947 | 8/1990 | Nakamura | 313/477 R X |
| 5,145,437 | 9/1992 | Ondra et al. | 445/45 |
| 5,214,348 | 5/1993 | Nakamura et al. | 313/477 R X |
| 5,293,096 | 3/1994 | Nakamura | 313/477 R |
| 5,304,890 | 4/1994 | Tsukui et al. | 313/477 R |
| 5,357,176 | 10/1994 | Nishio et al. | 313/376 |
| 5,445,285 | 8/1995 | Sugawara et al. | 220/2.1 A |
| 5,447,460 | 9/1995 | Nakamura et al. | 445/22 |

FOREIGN PATENT DOCUMENTS

| | | |
|---|---|---|
| 1614738B | 8/1978 | Germany . |
| 4311808A | 10/1993 | Germany . |
| 7142013 | 6/1995 | Japan . |
| 7142012 | 6/1995 | Japan . |

*Primary Examiner*—Kenneth J. Ramsey

[57] ABSTRACT

A glass bulb is physically reinforced to provide a tensile stress in the nearly central portion of wall thickness in the wall thickness direction and to provide a compressive stress on the surface. The physical reinforcement is specifically applied by air cooling reinforcement. The completed CRT is further shrinkage fitted so as to tighten the outer side face of a panel by a metal ring. At the time of the air cooling reinforcement, reinforcement is optimized by reinforcing the glass bulb (or the panel or a funnel) so as to be more effective by adding the stress distribution in a vacuum state of the picture tube having a rectangular screen and by the shrinkage fitting achieved by the metal ring. As a result, the problem of heavy weight, which was one of major defects of mass produced CRTs, is solved while the risk of implosion is still avoided.

15 Claims, 16 Drawing Sheets

5,547,409

MANUFACTURING METHOD OF PICTURE TUBE

BACKGROUND OF THE INVENTION

1. Field of the Invention

The present invention relates to a manufacturing method of a picture tube such as a cathode-ray tube (hereinafter to be called a CRT) to be used in a television receiver or as a computer display and the like.

2. Description of the Related Art

At first, relating to a general conventional structure of a picture tube, an example is described while referring to FIG. 1 showing a partially cut-away sectional plan view of a shadow mask color CRT having a rectangular screen.

In FIG. 1, reference numeral 1 denotes a CRT, which is basically formed as a vacuum glass bulb. This CRT 1 comprises a panel 2 formed of a panel screen 2A and a side face portion 2B surrounding periphery of the panel 2 and projecting to the rear side, being positioned at the front; a funnel 4 positioned in the middle being consecutive to the panel 2; and a neck 5 consecutive to the funnel 2; incorporating an electron gun (not shown), and positioned in the rear.

A fluorescent screen 3 is provided inside the panel screen 2A, and confronting this fluorescent screen 3, a shadow mask 6 having multiple holes is disposed. The fluorescent screen 3 must be composed of plural phosphors. In the manufacturing process, therefore, it is required to demount and to mount the shadow mask 6 to and from the panel 2 a plurality of times. Accordingly, the panel 2 and the funnel 4 are constituted to be separable, and the both members are sealed with frit glass, which is a glass solder. The sealed portion of the panel 2 and the funnel 4 is called a frit seal portion 7.

In the abovementioned general conventional CRT 1, since the inside is in vacuum state, flaws on the glass as the principal material may be expanded to cause cracks, which may possibly lead to breakdown called as an implosion. To prevent the implosion, usually, a cloth tape 8 is would around the panel side face portion 2B. The cloth tape 8 is further tightened with a metal ring 10 from above, and cracks formed at the panel screen 2A side are prevented from propagating into the frit seal portion 7 side to prevent breakdown, as an anti-implosion treatment. Besides, mounting lugs (not shown) for mounting the CRT 1 on the television receiver, are mounted simultaneously when fitting the metal ring 10.

FIG. 1, reference numeral 11 is an anode button sealed to the funnel 4, and 12 is a neck splice line which is a connection portion between the funnel 4 and the neck 5.

FIG. 2 is a schematic front view of the CRT 1. In FIG. 2, symbol O denotes a tube axis of the rectangular CRT 1, which coincides with a center Z of the fluorescent screen 3.

Incidentally, such CRT 1 is deformed in the ordinary design, by making vacuum, so that the panel screen 2A may draw a contour line nearly similar to the rectangular fluorescent screen 3. The broken line in FIG. 2 shows its contour line. It means that the principal stress (tension) of the outer surface of the bulb near the middle of each side of the rectangular fluorescent screen 3 (the direction along X, Y axis in screen 2A) as compared with the diagonal direction of the fluorescent screen 3.

FIG. 3 is a perspective view schematically showing only the fourth quadrant of the upper right quarter as seen from the front when the CRT 1 is in vacuum state. The hatching shows the portion with large principal stress in the outer surface. On the other hand, hatching in FIG. 4 shows the portion of large principal stress same as in the inner surface of the bulb. Its peak value is nearly same as in FIG. 3

In FIG. 3 and FIG. 4, the Y-axis section including the tube axis O (short axis section) is called as an S.A., the X-axis section (long axis section) is called as a an L.A., and the diagonal axis sect on is called as a D.A. As evident from FIG. 3, the X, Y axis end portions of the panel screen 2A, edge portion 2C, panel side face portion 2B, and vicinity of the frit seal portion 7 are problem points for the strength of the CRT 1.

FIG. 5 is a schematic diagram showing the shape of a mold match line portion showing the maximum shape portion as seen on the Z-axis section of the side face portion 2B of the panel 2. It is usually the portion to be tightened by the metal ring 10. In addition, FIG. 5 shows only the first quadrant (the upper right portion of the panel screen 2A of the CRT), same as in FIG. 3 and FIG. 4.

As shown in FIG. 5, the upper portion and lower portion of the panel 2 are formed in a relatively large radius of curvature RL, and the right and left side portions are formed in a radius of curvature RS nearly same as the radius of curvature RL of the upper portion and lower portion, while the corners are formed in a relatively small radius of curvature r as compared with the radius of curvature RL or RS. The radius of curvature r of the corners is smoothly connected with the radii of curvature RL and RS at both sides, and the contact point of the radii of curvature RS and r is D1, and the contact point of RL and r is D2.

In FIG. 5, the maximum positions of the panel side face portion 2B in the x, y axis direction are supposed to be xM, yM, respectively.

FIG. 6 is a schematic diagram showing the surface pressure received by the panel side face portion 2B when the panel side face portion 2B is tightened with the metal ring 10. The surface pressure is applied in the perpendicular direction to the side face portion 2B. Therefore in FIG. 6, the magnitude P of the surface pressure is indicated in the perpendicular direction of the panel side face portion 2B. The surface pressure between yM and D2 is constant at PL, the surface pressure between D1 and D2 is constant at PD, and the surface pressure between D1 and xM is constant at PS. In other words, between yM and d2, between D1 and D2, and between D1 and xM, the radius of curvature of the panel side face portion 2B is constant. Further, when tightened by the metal ring 10, the surface pressure is constant, individually. At this time, the surface pressure to the panel side face portion 2B is inversely proportional to the radius of curvature of the panel shape.

A practical example of surface pressure is shown in a 37-inch CRT.

xM=(391.8, 0), yM=(0, 309.0)

RL=5521.9 mm, RS=5433.8 mm, r=35.0 mm $PL=5.060 \times 10^{-3}$ kgf/mm$^2$, $PD=7.983 \times 10^{-1}$ kgf/mm$^2$, $PS=5.142 \times 10^{-3}$ kgf/mm$^2$ What is of note here is that RL, RS>>r, and therefore the effect of the metal ring 10 is almost dominant between D1 and D2 which are corners of the panel 2. This tendency holds true regardless of the CRT size, although the numerical values are slightly different.

FIG. 7 and FIG. 8 are graphs of the stress generated in the CRT 1 by the metal ring 10 shown in FIG. 6 expressed on the axis of abscissas taken from the center of the panel screen 2A to the neck 5 in the direction of the short axis section S.A., long axis section L.A. and diagonal axis section D.A., while the principal stress is plotted on the axis of ordinates. FIG. 7 shows the stress generated on the outer surface of the CRT 1, and FIG. 8 inner surface of the CRT 1. A characteristic fact herein is that the effect by tightening force of the metal ring 10 wound on the panel side face portion 2B mainly acts on the position of the metal ring 10, particularly effective on the panel side face portion 2B of the diagonal axis section D.A., while the effects on outside and inside are in a contradictory relation.

The panel 2 and funnel 4 used in the CRT 1 of the conventional glass bulb are generally made of distortion free or nearly distortion free glass bulb. In the CRT for projection television which is recently distributing widely, the load of the voltage x current inside the panel 2 is extremely large as compared with that of a CRT for general television receiver, and therefore the outer surface of the glass panel 2 is cooled in the state of use.

Besides, in order to further enhance the reliability, a reinforcing measure is taken, for example, by generating a compressive stress by so-called ion-exchange on the outer surface of the screen surface of the panel. FIG. 9 is a schematic diagram showing the state of compressive stress and tensile stress on the section of the glass when such measure is taken. As indicated by broken line, a compressive stress layer of about 20 µm is formed on the surface side of the outside of the glass panel 2.

In this way, in the conventional CRT, in order to avoid the implosion, a glass bulb formed of a thick glass having enough strength was used, and it was heavy.

SUMMARY OF THE INVENTION

The invention is devised in the light of such background and it is hence a primary object thereof to solve the problem of heavy weight which is one of the major defects of the conventional mass-produced CRTs, while avoiding the risk of implosion.

It is other object to provide a manufacturing method of a picture tube capable of avoiding increase of wedge amount in the peripheral portions of the panel screen, optimizing the amount of preliminary reinforcement of the outer surface and inner surface of the glass on the side face of the panel at corners of screen panel, avoiding adverse effects of non-uniform distortion of a funnel on the vicinity of an anode button and vicinity of a neck splice line, and preventing glass fragments from being broken into small pieces when the glass bulb is broken.

In a first invention of a manufacturing method of a cathode-ray tube of the invention is characterized by, basically, physically reinforcing a glass bulb so as to apply preliminarily a tensile stress in the nearly central portion of a wall thickness in its wall thickness direction and a compressive stress on the surface, and shrinkage-fitting a completed CRT by tightening the outer surface of a panel with a metal ring. In this physical reinforcement process, the glass bulb (panel or funnel) is reinforced and optimized so as to be more effective by adding the characteristic of stress distribution in vacuum of the picture tube having a rectangular screen and the characteristic of shrinkage fitting by the metal ring. In the following description, the process for generating a stress by physical reinforcement process in an independent state of the glass bulb, such as a panel or a funnel in this case, as a component for manufacturing of the picture tube is called preliminary reinforcement. It is a basic feature of the invention to perform such preliminary reinforcement.

A second invention of a manufacturing method of a picture tube of the invention is characterized by preliminary reinforcement so that the sum of the absolute value of tensile stress and the absolute value of compressive stress in the corners of the side face of the panel for composing a rectangular screen of the picture tube is smaller than that of the short axis and long axis directions.

A third invention of a manufacturing method of a picture tube of the invention is characterized by preliminary reinforcement so that the compressive stress on the outer surface of the panel may increase gradually, from the screen center (center of panel screen) to the end portion (edge portion where the panel screen and the side portion of the panel contact with each other), for example, considering the short axis section S.A. of the panel.

A fourth invention of a manufacturing method of a picture tube of the invention is characterized by preliminary reinforcement so that the magnitude of the compressive stress differs between outside and inside of the glass bulb.

A fifth invention of a manufacturing method of a picture tube of the invention is characterized by preliminary reinforcement so that the compressive stress of the outer surface may be smaller than the compressive stress of the inner surface, by applying the technique of the fourth invention only on the outside of the corners of the rectangular panel.

A sixth invention of a manufacturing method of a picture tube of the invention is intended to have the effects of the preliminary reinforcement smaller in the vicinity of an anode button of the funnel than in other portions.

A seventh invention of a manufacturing method of a picture tube of the invention is characterized by preliminary reinforcement which is not applied to the neck side from the vicinity of the splice line of the funnel.

An eighth invention of a manufacturing method of a picture tube of the invention is characterized by preliminary reinforcement so that the compressive stress may always be larger than the tensile stress from the end portion to the side face portion of the short axis section and long axis section of the panel screen.

In the first invention of a manufacturing method of a picture tube of the invention, the completed glass bulb is manufactured so as to have a tensile stress in the nearly central portion of the wall thickness in the wall thickness direction, and a compressive stress on the surface.

In the second invention of a manufacturing method of a picture tube of the invention, the effect of anti-implosion treatment by the metal ring appears more greatly in the corners than in the center of the panel screen, but it is finally optimized because the glass panel in which the amount of preliminary reinforcement is smaller in the corners than in the center of the screen panel is obtained.

In the third invention of a manufacturing method of a picture tube of the invention, the preliminary reinforcement is preformed so that the compressive stress may gradually increase from the screen center toward the edge, while the wedge amount in the peripheral portions of the panel screen is curtailed by the corresponding amount.

In the fourth invention of a manufacturing method of a picture tube of the invention, the amount of preliminary reinforcement is optimized between the outer surface and inner surface of the glass.

In the fifth invention of a manufacturing method of a picture tube of the invention, the amount of preliminary reinforcement is optimized between the outer surface and inner surface of the glass on the panel side face portion at corners.

In the sixth invention of a manufacturing method of a picture tube of the invention, the effect of preliminary reinforcement is small near the anode button of the funnel where distortion is not uniform, so that possibility of adverse effects may be avoided.

In the seventh invention of a manufacturing method of a picture tube of the invention, similarly, preliminary reinforcement is not effected near the neck splice line, so that possibility of adverse effects may be avoided.

In the eighth invention of a manufacturing method of a picture tube of the invention, tensile stress does not occur at least in the edge portions from the screen end to the side face portion of the panel screen, and therefore when the bulb is broken, the glass is broken into relatively larger pieces.

The above and further objects and features of the invention will more fully be apparent from the following detailed description with accompanying drawings.

DESCRIPTION OF THE PREFERRED EMBODIMENTS

Prior to description of the invention by reference to accompanying drawings, the principle of the invention is explained below.

Figure 10:
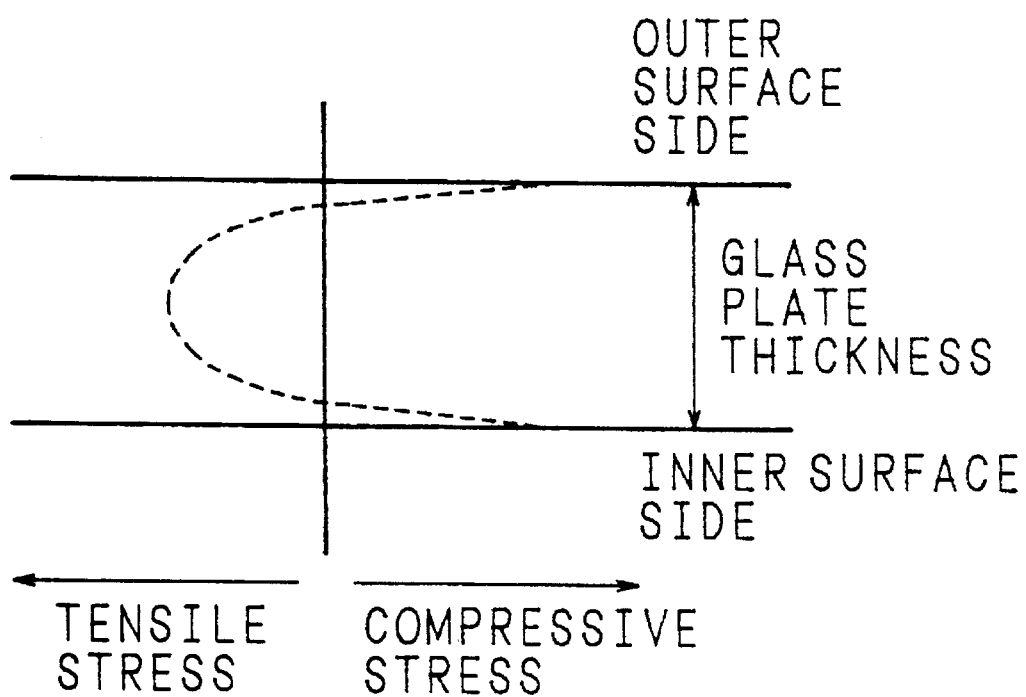
FIG. 10 is a graph showing the distribution of stress by physical reinforcement process on the general glass, specifically air cooling reinforcement process, for showing the basic principle of the invention.

FIG. 10 shows the distribution of stress in the case where the air cooling reinforcement is applied on general glass as a kind of physical reinforcement process.

In the first invention of a manufacturing method of a picture tube of the invention, a glass bulb is preliminarily provided with stress by an air cooling reinforcement, not be reinforcement by ion-exchange technique conventionally applied to a CRT. Thereafter a completed CRT is shrinkage fitted by tightening the outer side of the panel with a metal ring. At this time, it is optimized by reinforcing the glass bulb (panel 2 or funnel 4) beforehand so as to be more effective by adding the characteristic of stress distribution when the CRT having the rectangular screen is in a vacuum state, and by adding the characteristic of shrinkage fitting by the metal ring.

In the following description, the treatment to generate a stress as shown in FIG. 10 by a physical reinforcement process such as an air cooling reinforcement for the glass bulb, or panel 2 or funnel 4 in an independent state in this case, as a component for manufacturing the CRT is called as a preliminary reinforcement. The preliminary reinforcement is the primary condition of the invention.

In the second invention of the manufacturing method of a picture tube of the invention, the sum of the absolute value of a tensile stress $\sigma T$ and the absolute value of a compressive stress $\sigma C$ in the corners of a side face portion 2B of the panel 2 for composing the rectangular screen of the CRT is made to be smaller than that of the short axis section S.A. and the long axis section L.A. In other words, the amount of preliminary reinforcement is smaller in the corners of the panel 2.

The reason is that the effect of the tightening force by the metal ring 1Q appears more powerfully in the corners because a radius of curvature of the corners of the side face portion 2B of the panel 2 is smaller than in other portions, after finishing the anti-implosion treatment by the metal ring 10. Accordingly, it does not matter when the amount of the preliminary reinforcement is smaller at the corners of the panel 2.

Figure 8:
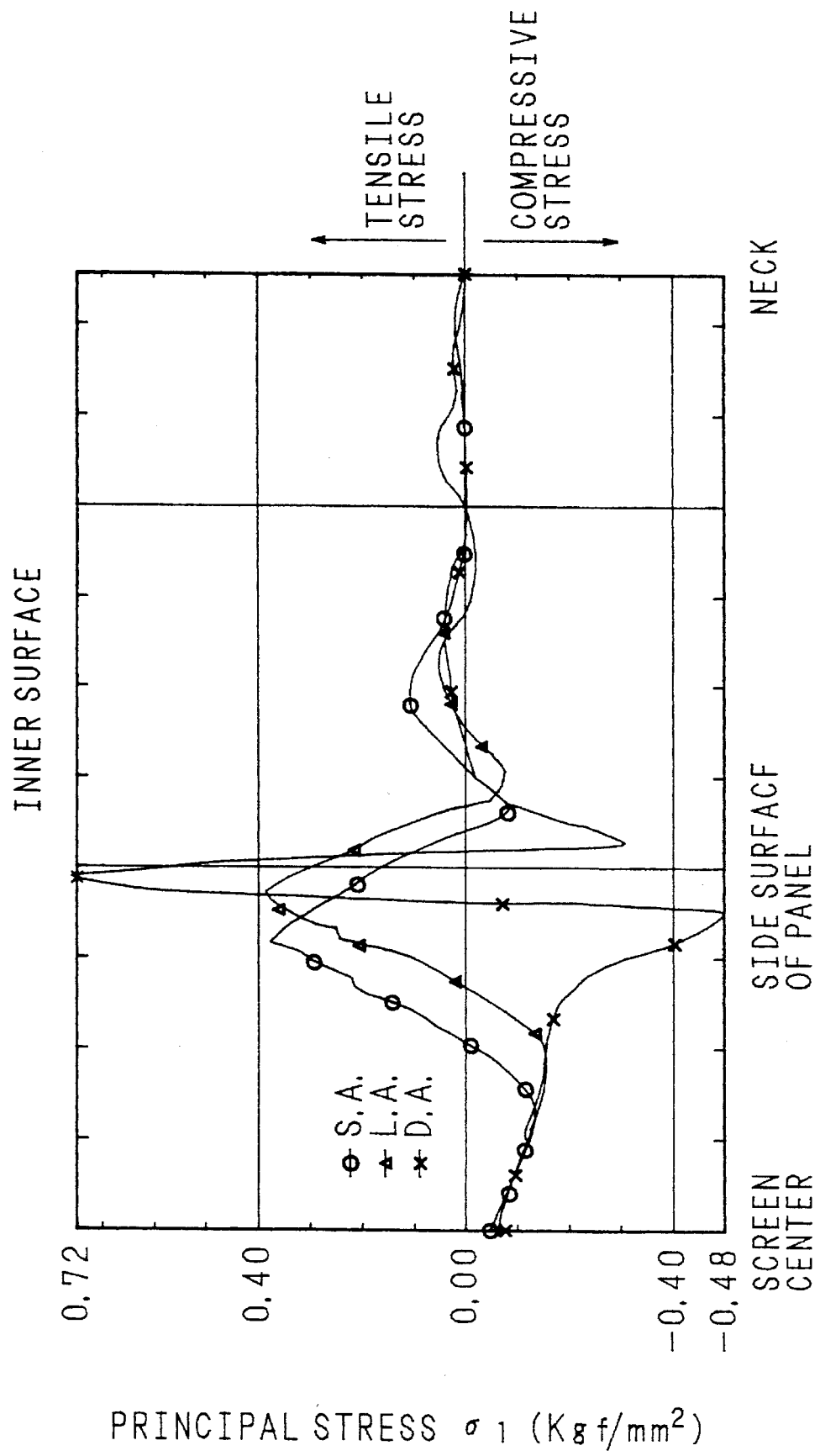
FIG. 8 is a graph showing a stress generated inner surface of a CRT when the panel side face portion of the CRT is tightened by a metal ring.
Figure 9:
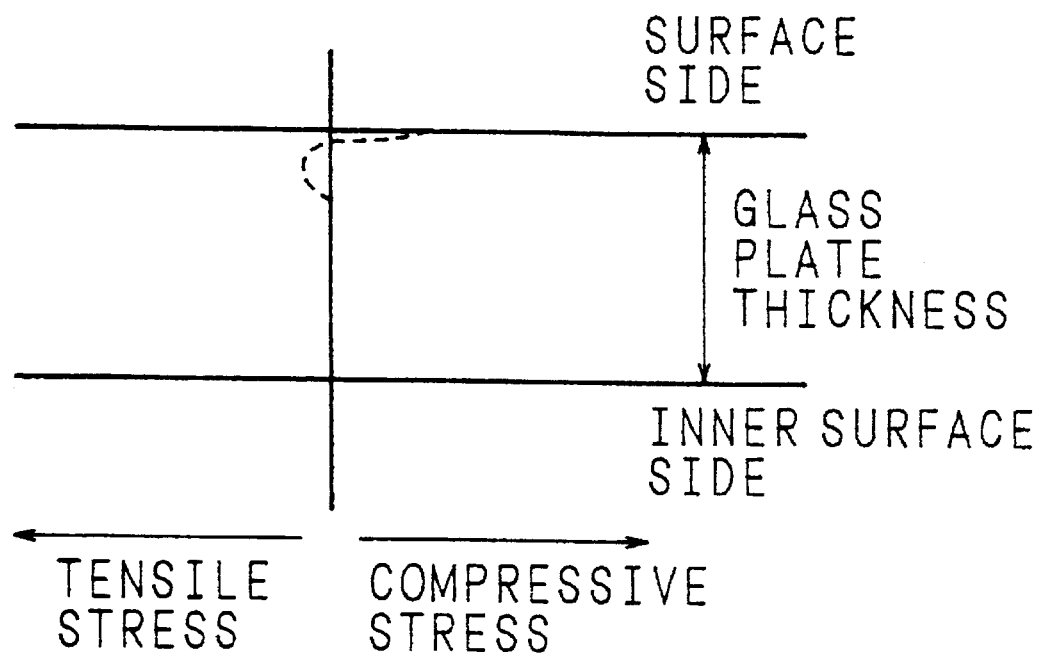
FIG. 9 is a schematic diagram showing the state of a compressive stress and tensile stress on glass section of reinforcement measure by generating a compressive stress by so-called ion-exchange technique on the outer surface of the of a CRT panel.

Besides, as is clear from FIG. 8, on the inner surface of the panel 2, to the contrary, the tensile stress occurs, and in the actual CRT manufacturing process, considering the reality of a high possibility of flawing due to collision of the shadow mask 6 against the corner portions of the panel 2 when demounting or mounting the shadow mask 6, the preliminary reinforcement amount of the corners is preferred to be smaller.

In the third invention of the manufacturing method of a picture tube of the invention, for example, considering the short axis section S.A. of the panel 2, the compressive stress is increased gradually by preliminary reinforcement on the outer surface of the panel 2, from the screen center (center of panel screen 2A) to the edge portion (the edge portion where the panel screen 2A and the panel side face portion 2B contact with each other).

Figure 11:
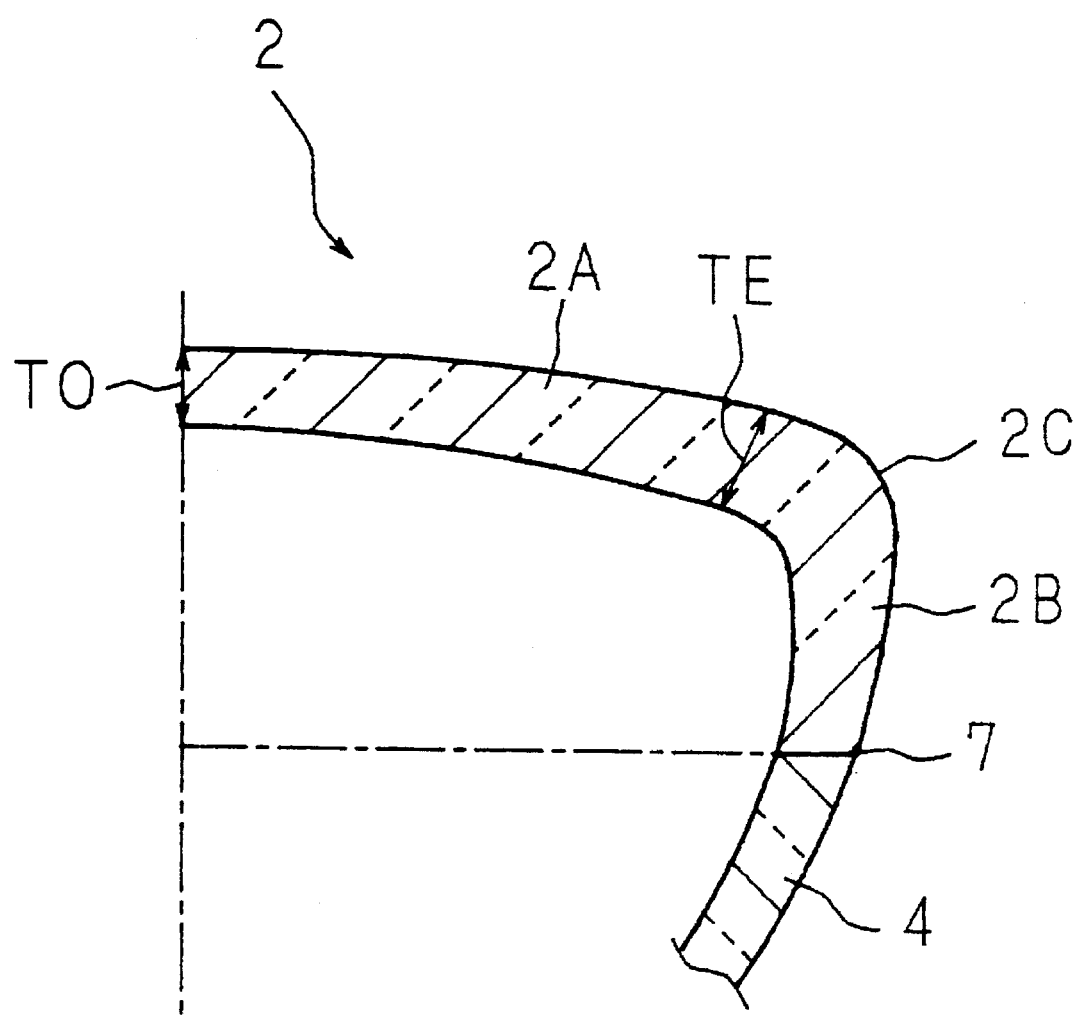
FIG. 11 is a schematic diagram showing the state of wall thickness of glass in the screen center and peripheral portions near the edge of a panel in an ordinary design of a glass bulb.

This is because of the following reason. In an ordinary CRT, when the inside is in a vacuum state, the portion high in tensile stress is shown by hatching in FIG. 3. As its measure, in designing of an ordinary glass bulb, as shown in FIG. 11, the wall thickness TE of the peripheral portions close to the edge portion is made to be slightly larger than the glass wall thickness T0 of the screen center of the panel 2 according to the following equation.

$$TE=T0+\alpha (mm)$$

Where, $\alpha$ is the amount determined by the size of the CRT, and it is generally known as a wedge. Specifically, the wedge is in the order of about 0.5 mm (small tube) to 2.0 mm (large tube). Thus, this problem can be solved by slightly increasing the wall thickness in the peripheral portions of the panel 2.

However, the abovementioned wedge brings about the following demerits.

Figure 12:
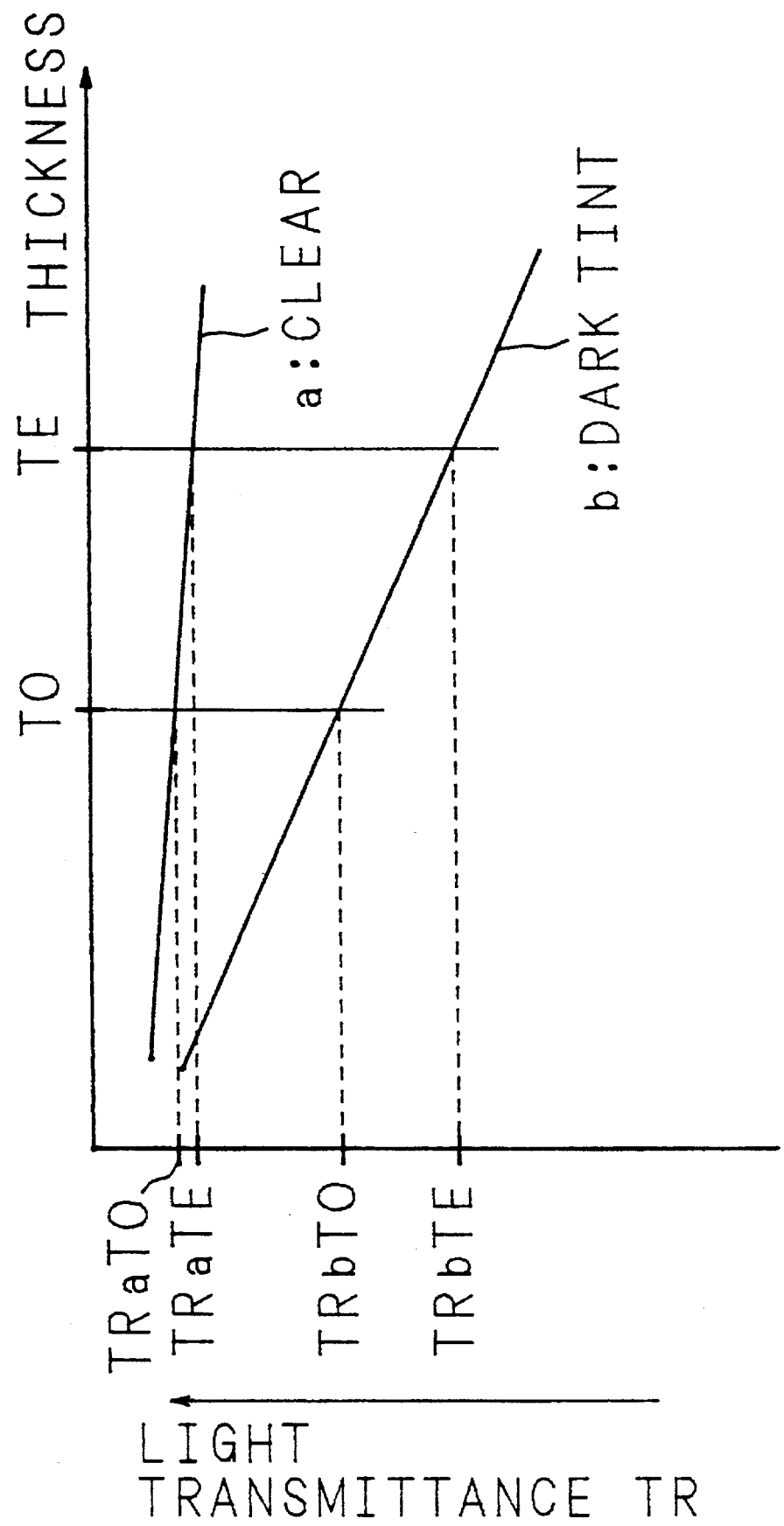
FIG. 12 is a graph showing the relation between the wall thickness of a glass panel and transmission rate.

FIG. 12 is a graph showing the relation between the wall thickness of panel glass plotted on the axis of abscissa and the light transmission rate of the panel glass plotted on the axis of ordinates. In FIG. 12, a line indicated by reference character "a" denotes the transmission rate of the glass material having high transmission rate known as "clear" material, and the line "b" shows the transmission rate known as "dark tint" material.

In the conventional CRT, the clear material was used, and the difference was relatively small between the transmission rate TRaT0 at the glass wall thickness in the screen center and the transmission rate TRaTE at the wall thickness TE in the peripheral portion close to the edge, and hence it was no problem. Recently, however, in order to improve the picture quality, specifically to improve the contrast, the dark tint material is mainly used as the glass material.

Incidentally, the difference between the transmission rates TRbT0 and TRbTE is about 5%. This means that the brightness of the fluorescent screen is lowered by about 5% in the peripheral portions as compared with the central portion. In the second invention, therefore, by making the stress smaller in the hatched area in FIG. 3 than in other portions, this preliminary reinforcement is utilized in order to keep the increase in the peripheral portions of the wall thickness of the screen glass to a minimum required limit.

Figure 7:
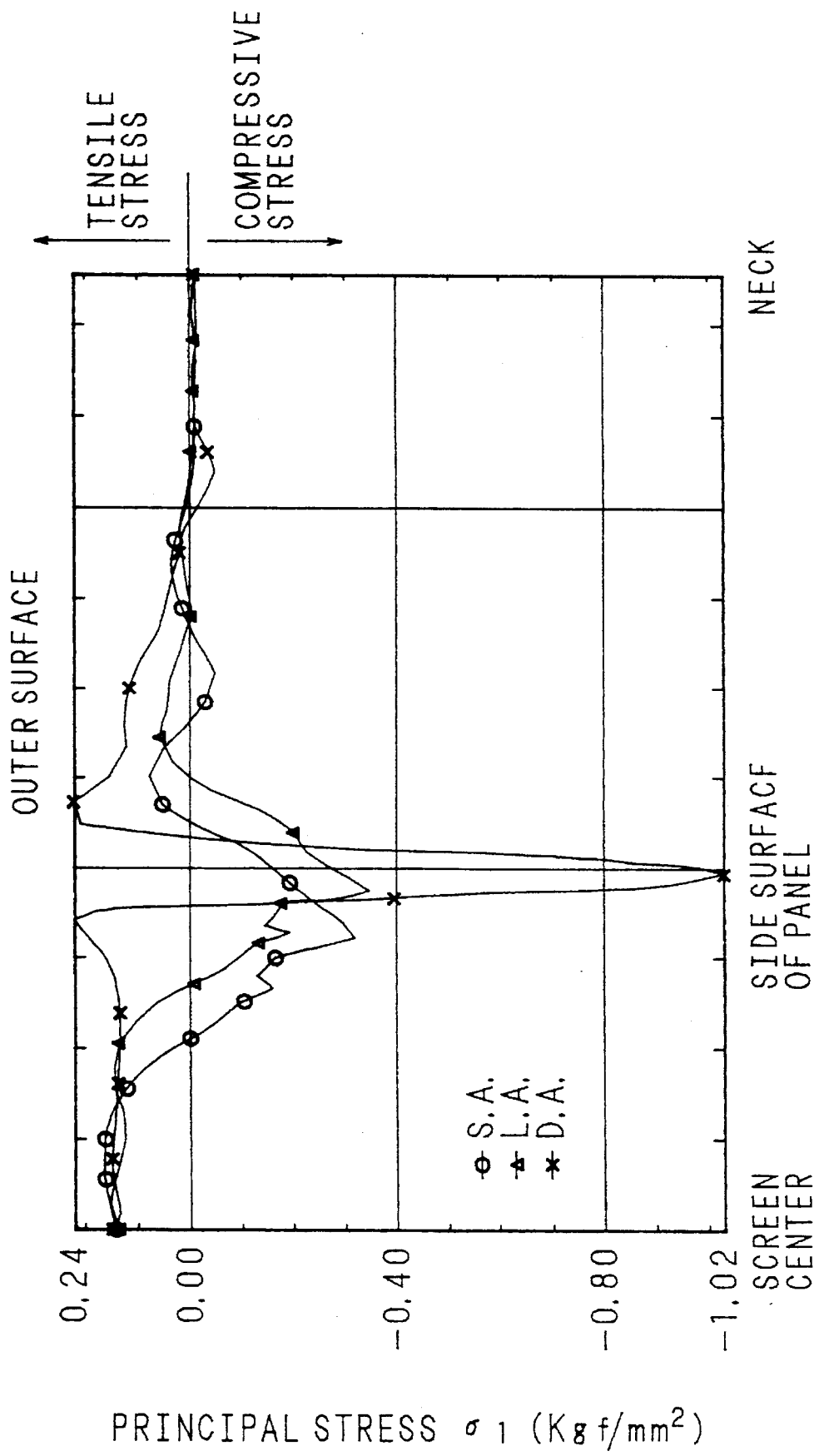
FIG. 7 is a graph showing a stress generated outer surface of a CRT when the panel side face portion of the CRT is tightened by a metal ring.

This is because a sufficient effect is not obtained in the important portions of the axis of the short axis section S.A. and the long axis section L.A. shown in FIG. 7 by the tightening force with the metal ring 10 alone. Accordingly, in actual preliminary reinforcement, the compressive stress may be set at about 0.1 kgf/mm² in the panel central portion, or about 0.5 kgf/mm² in the peripheral portions. When, however, it is difficult to reduce the compressive stress of the central portion of the panel screen, it is not harmful when it is stronger than necessary, for example, about 0.3 kgf/mm².

It is thus possible to avoid an increase of wedge amount in the peripheral portions of the panel screen.

In the fourth invention of the manufacturing method of a picture tube of the invention, the magnitude of compressive stress by preliminary reinforcement varies between inside and outside of the glass.

The reason is that it is not necessary to apply an equivalent stress on the outer surface and inner surface of the glass by preliminary reinforcement, and that a better result is obtained by optimizing according to the specific circumstances. These include considering the stress generating in the glass in the vacuum state, the stress distribution for correcting it by the metal ring 10, and the portion of the glass bulb where flaws easily generate during the manufacturing process.

In the fifth invention of the manufacturing method of a picture tube of the invention, by applying the technique of the fourth invention only on the outer surface of the corners of the rectangular panel, the compressive stress of the outer surface is made to be smaller than the compressive stress of the inner surface.

The reason is, as shown in FIG. 7 and FIG. 8 abovementioned, that the outer surface of the panel screen is greater in the effect of the metal ring 10 (the difference between −1.0 and +0.7), and that the corners of the inner surface are likely to collide against the shadow mask 6 in the manufacturing process and are hence more easily flawed. Therefore it does not matter when the outer surface of the corners of the panel side face portion 2B is slightly lower in the stress than the inner surface.

In the sixth invention of the manufacturing method of a picture tube of the invention, the effect of preliminary reinforcement is made to be smaller near an anode button of a funnel 4. a picture tube of the invention, the abovementioned preliminary reinforcement is not performed to the portion of the neck 5 side from the vicinity of the splice line 12 of the funnel 4.

The reason is that the preliminary reinforcement may adversely affect near the anode button 11 because the distortion is not uniform as a result of sealing of the metal anode button 11 on the funnel 4. Besides, the neck splice line 12 is the joint of the funnel 4 and neck 5, which is the same reason.

In the eighth invention of the manufacturing method of a picture tube of the invention, the compressive stress $\sigma C$ is always larger than the tensile stress $\sigma T$ from the screen end to the panel side face portion 2B of the short axis section S.A. and the long axis section L.A. by the preliminary reinforcement. In other words, in the hatched area in FIG. 3, the relation of the tensile stress $\sigma T$ and the compressive stress $\sigma C$ of preliminary reinforcement is $\sigma C > \sigma T$.

Figure 1:
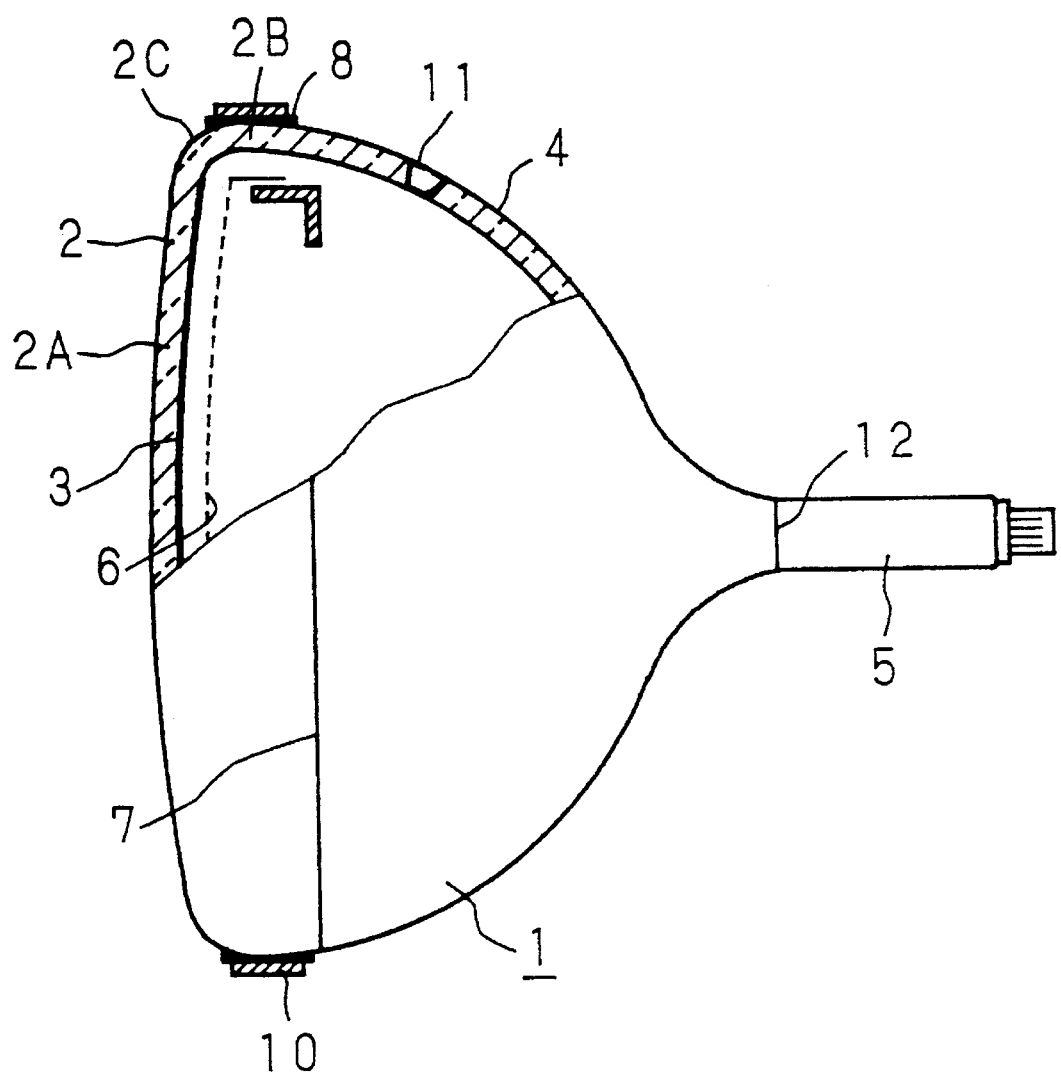
FIG. 1 is a schematic diagram showing a partial sectional plan of a shadow mask color CRT having a rectangular screen as an example of a structure of a general conventional CRT.
Figure 2:
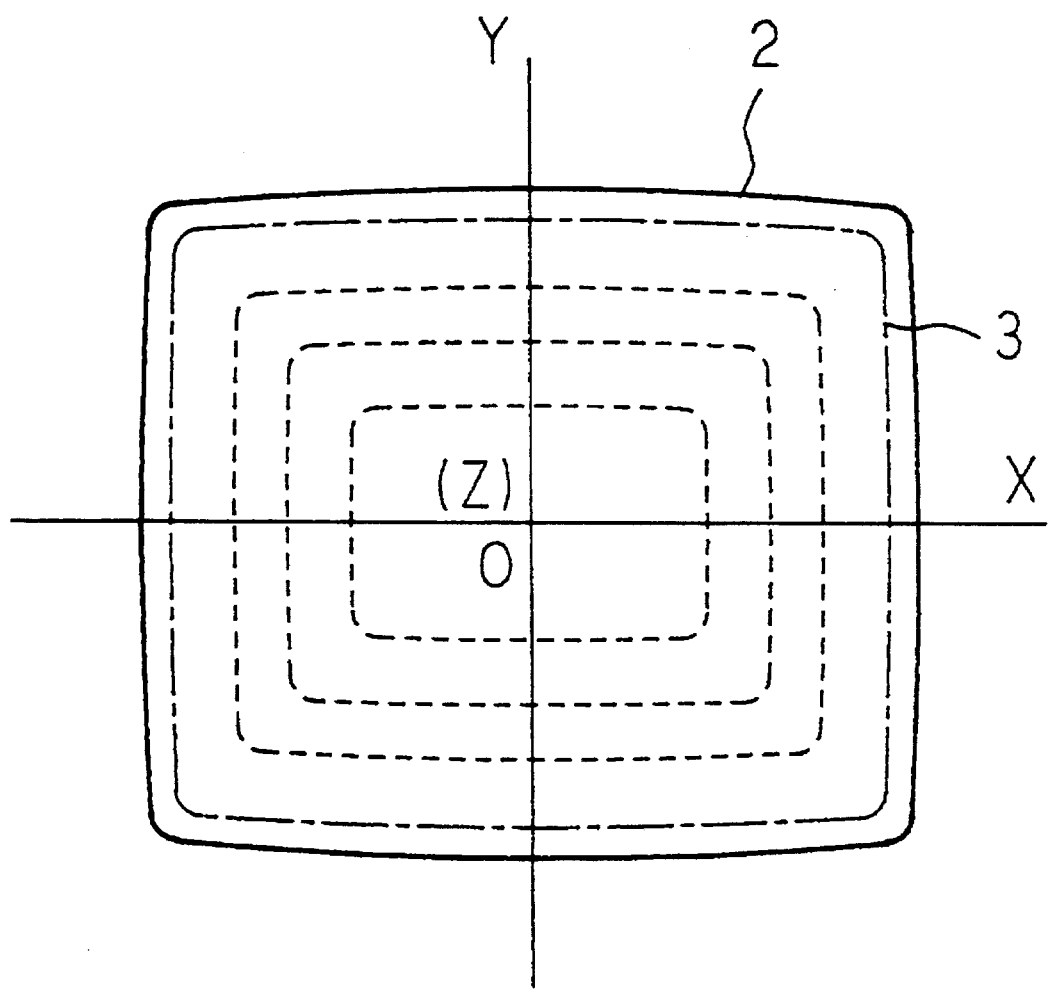
FIG. 2 is a schematic front view of a general conventional CRT.
Figure 3:
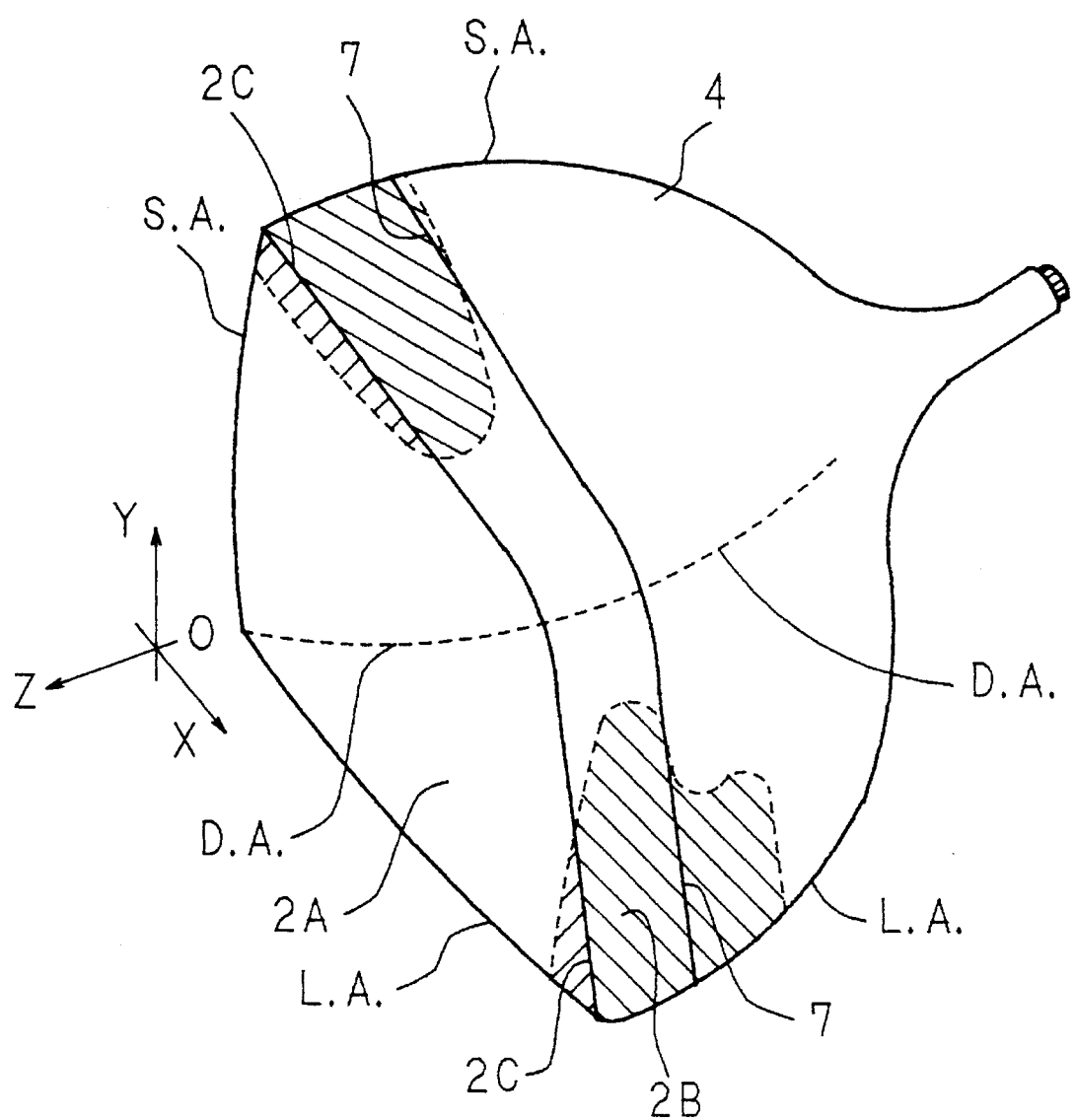
FIG. 3 is a schematic perspective view of a first quadrant of an upper right quarter portion as seen from the front of a CRT in vacuum state, showing the portion of large principal stress of outside by hatching.
Figure 4:
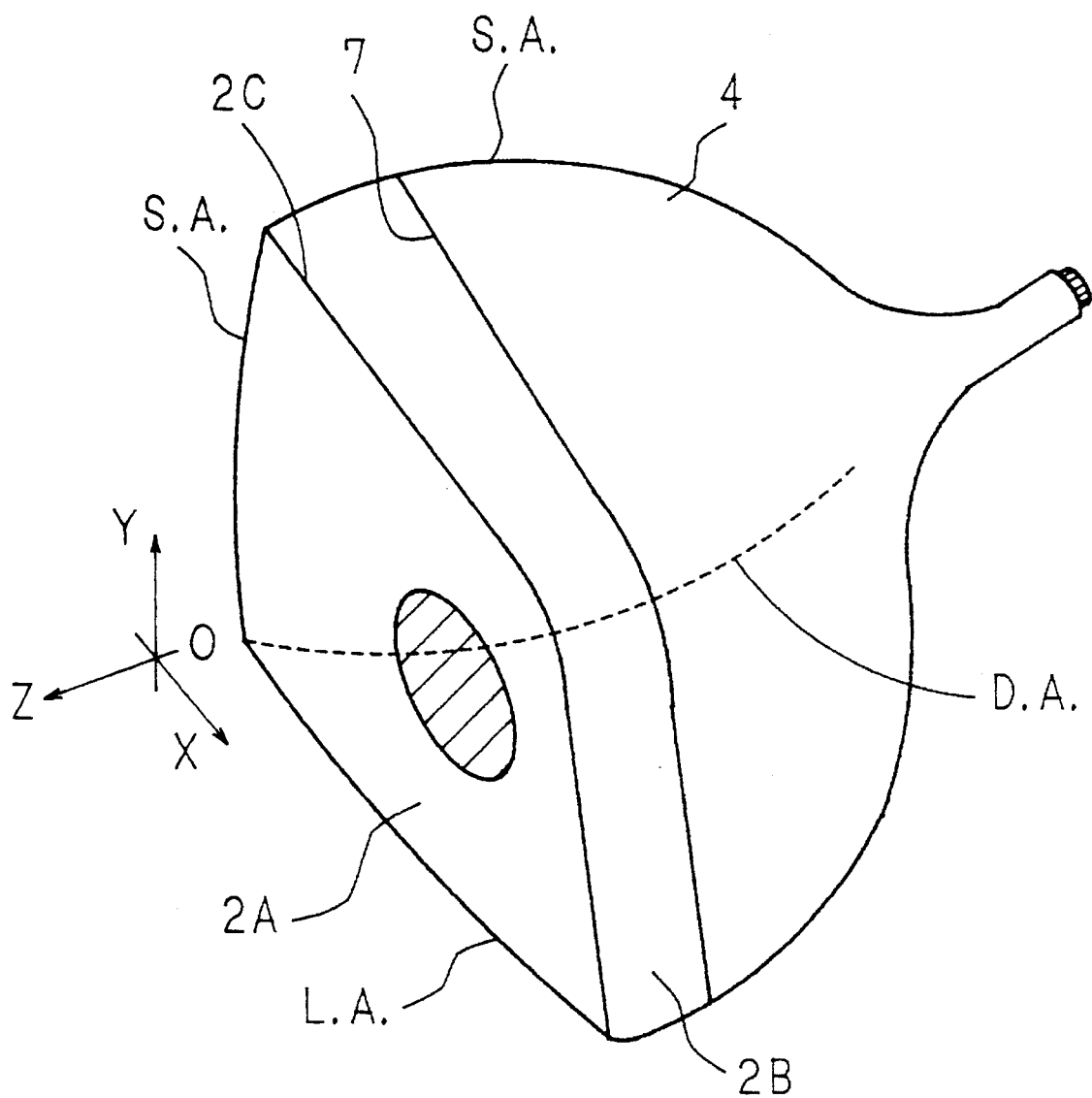
FIG. 4 is a schematic perspective view of a first quadrant of an upper right quarter portion as seen from the front of a CRT in vacuum state, showing the portion of large principal stress of inside by hatching.
Figure 5:
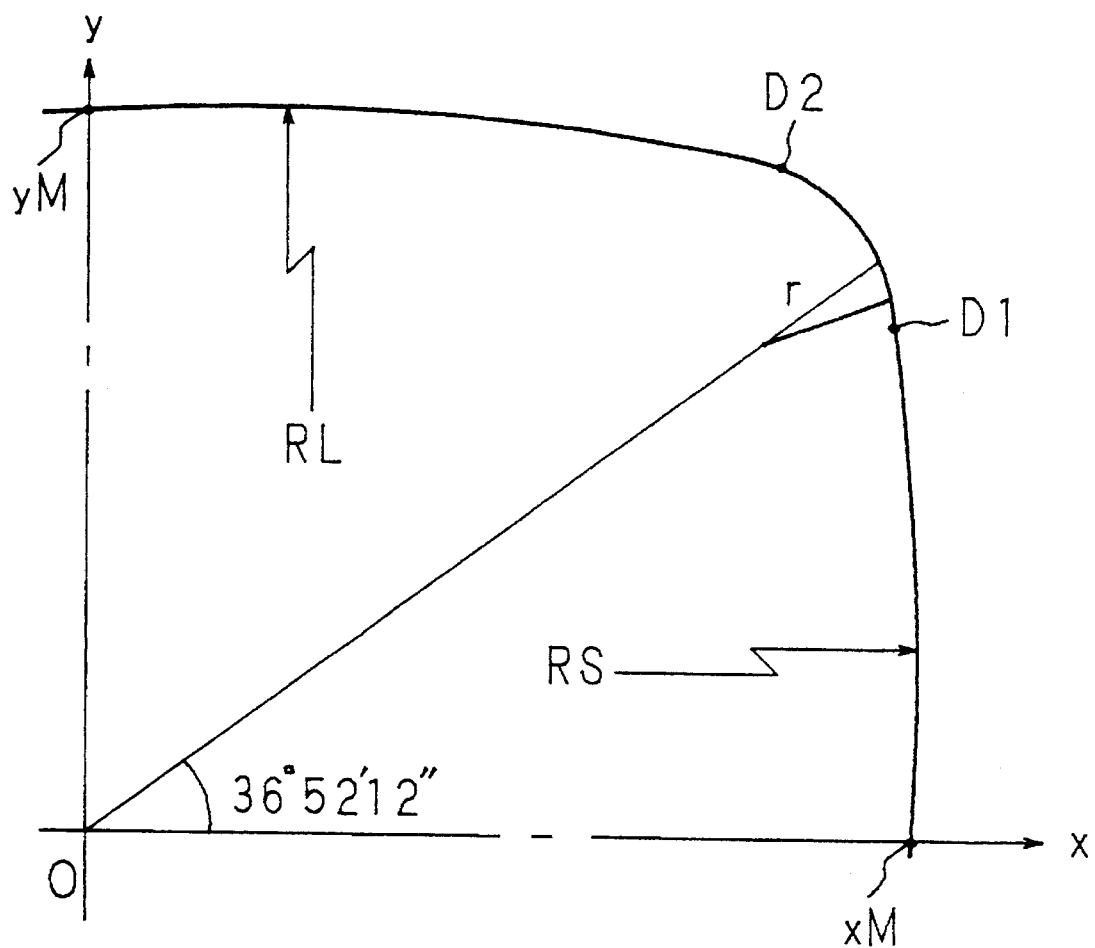
FIG. 5 is a schematic diagram showing a shape of a mold match line portion showing the maximum shape portion as seen from the Z-axis section of the panel side portion of a CRT.

The reason is that the tensile stress may not be given at least in the important portions indicated by hatching in FIG. 3 although the preliminary reinforcement amount fluctuates in mass production of CRT. Moreover, when the bulb should be broken due to some reason, and it is often originated in the hatched area, it is preferred that the value of $\sigma T$ be smaller in order that the glass may not be broken into smaller pieces. In every nation, the safety standard of CRT is stipulated, and it is specified by the amount of the glass fragments popping out into the front and the size of the broken pieces of the glass when the CRT is broken.

Referring now to the drawings, practical embodiments of the manufacturing method of a picture tube of the invention are described in detail below.

[Embodiment 1]

Figure 13:
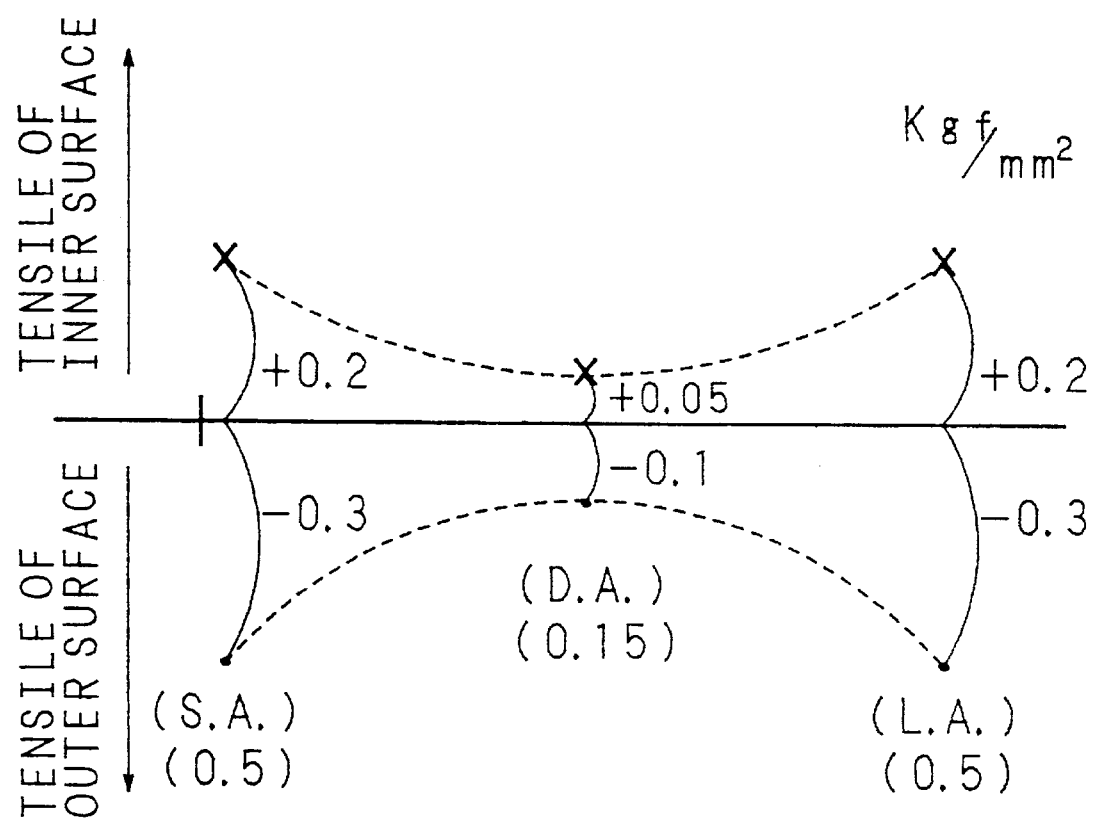
FIG. 13 is a schematic graph showing the state of a stress by developing the panel side face portion into the short axis section (S.A), diagonal axis section (D.A.) and long axis section (L.A.), of a panel of picture tube of, for example, 29-inch size preliminarily reinforced by the manufacturing method of a picture tube of the invention.

FIG. 13 is a schematic graph showing a state of the stress of the panel 2 of a picture tube of, for example, 29-inch size CRT preliminarily reinforced as mentioned above, by developing the panel side face portion 2B into the short axis section (S.A.), diagonal axis section (D.A.), and long axis section (L.A.).

In this example, the preliminary reinforcement is effected so that the sum of absolute value ($|\sigma C|+|\sigma T|$) of tensile stress $\sigma T$ and absolute value of compressive stress $\sigma C$ of preliminary reinforcement may be 0.5 kgf/mm$^2$ on the short axis section S.A. and long axis section L.A., and 0.15 kgf/mm$^2$ on the diagonal axis section D.A.

Figure 6:
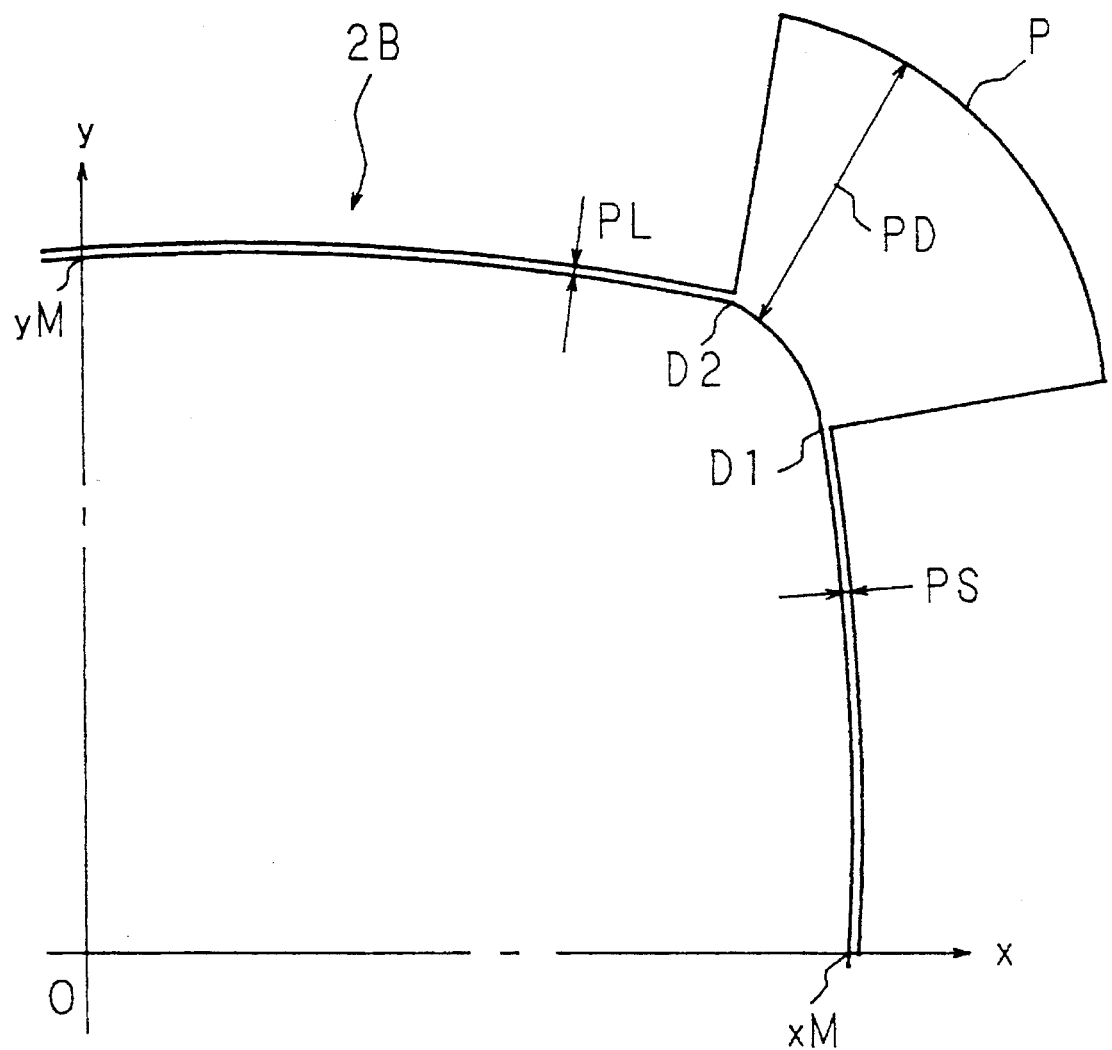
FIG. 6 is a schematic diagram showing a surface pressure applied to the panel side portion when a panel side face portion of a CRT is tightened by a metal ring.

In the invention, by using thus preliminarily reinforced panel, evacuating the inside, and further applying the anti-implosion treatment by the metal ring 10 as shown in FIG. 6, a CRT is manufactured.

[Embodiment 2]

Figure 14:
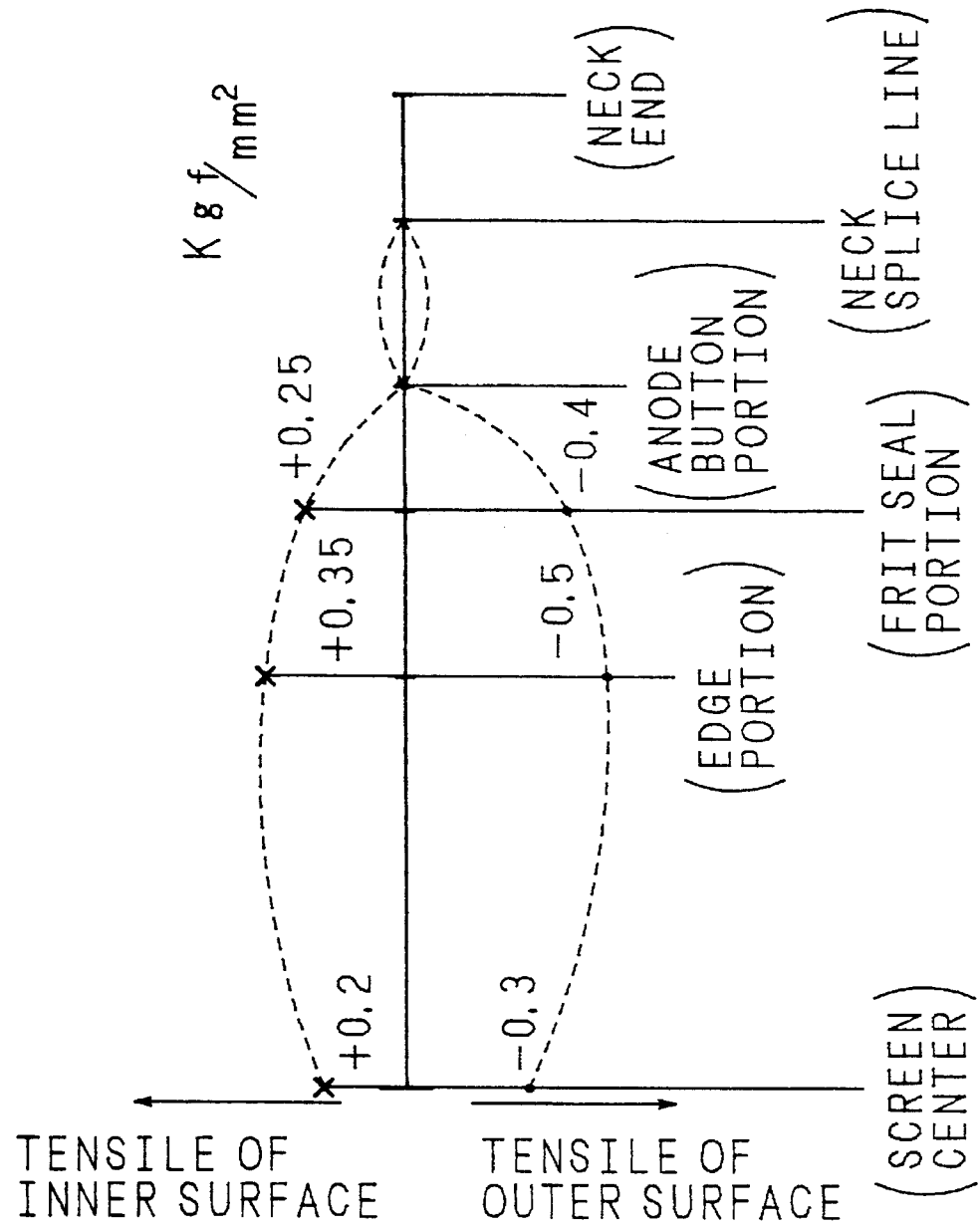
FIG. 14 is a schematic graph showing the state of stress by preliminary reinforcement from the panel center to the end of neck in the short axis section S.A., direction, of a panel of picture tube of, for example, 29-inch size preliminarily reinforced by the manufacturing method of a picture tube of the invention.

FIG. 14 is a schematic graph showing a state of the stress by preliminary reinforcement from the panel center to the end of neck 5 in the short axial section S.A. direction, for example, in a panel of picture tube, for example, a 29-inch size CRT.

Concerning the funnel 4, however, since the effect is smaller as compared with the effect of preliminary reinforcement on the panel 2, preliminary reinforcement may be applied only on the panel 2.

In this embodiment, the preliminary reinforcement is given so that the compressive stress may be −0.3 kgf/mm$^2$ in the center of the panel screen 2A, −0.5 kgf/mm$^2$ in the edge, and −0.4 kgf/mm$^2$ in the seal portion.

Near the anode button 11 and near the neck splice line 12, the preliminary reinforcement is applied so that the compressive stress may be nearly zero. In other words, these portions are not reinforced.

[Embodiment 3]

Figure 15:
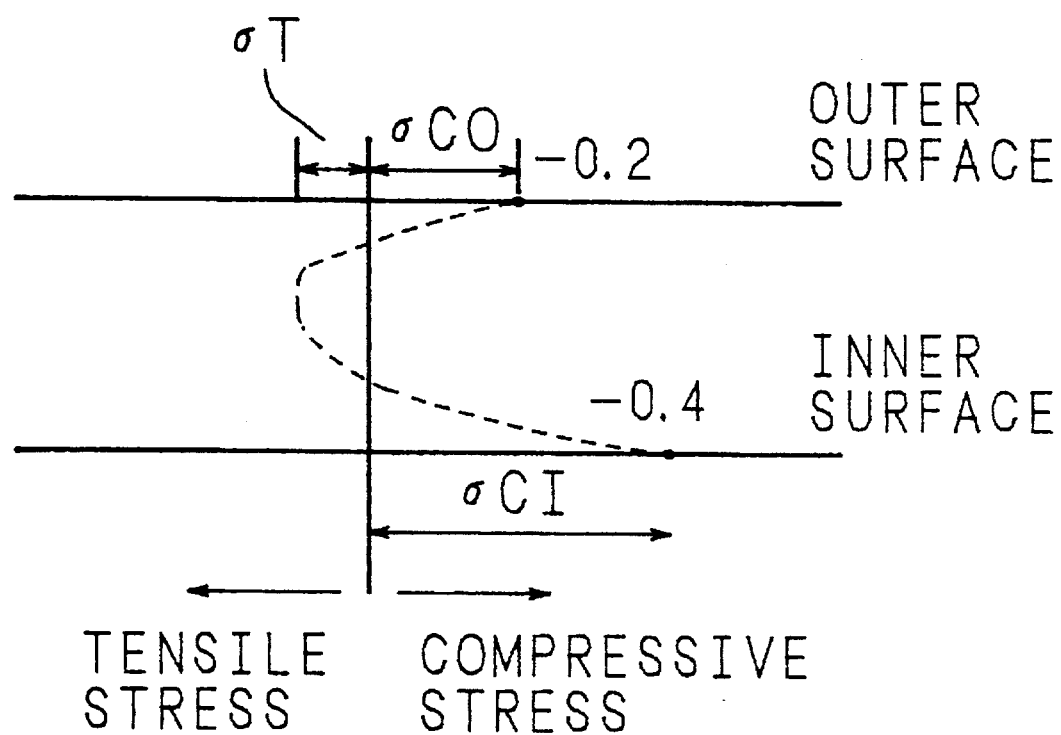
FIG. 15 is a schematic graph showing the state of preliminary reinforcement to provide with a compressive stress of $-0.2$ kgf/mm$^2$ on outer surface and $-0.4$ kgf/mm$^2$ on inner surface, in the corners and panel side face portion of a square screen of, for example, a picture tube preliminarily reinforced by the manufacturing method of a picture tube of the invention.

FIG. 15 further shows an example of applying preliminary reinforcement to the corners and panel side face portion 2B of the square screen, so that the compressive stress may be −0.2 kgf/mm$^2$ on the outer surface, and −0.4 kgf/mm$^2$ on the inner surface.

[Embodiment 4]

Figure 16:
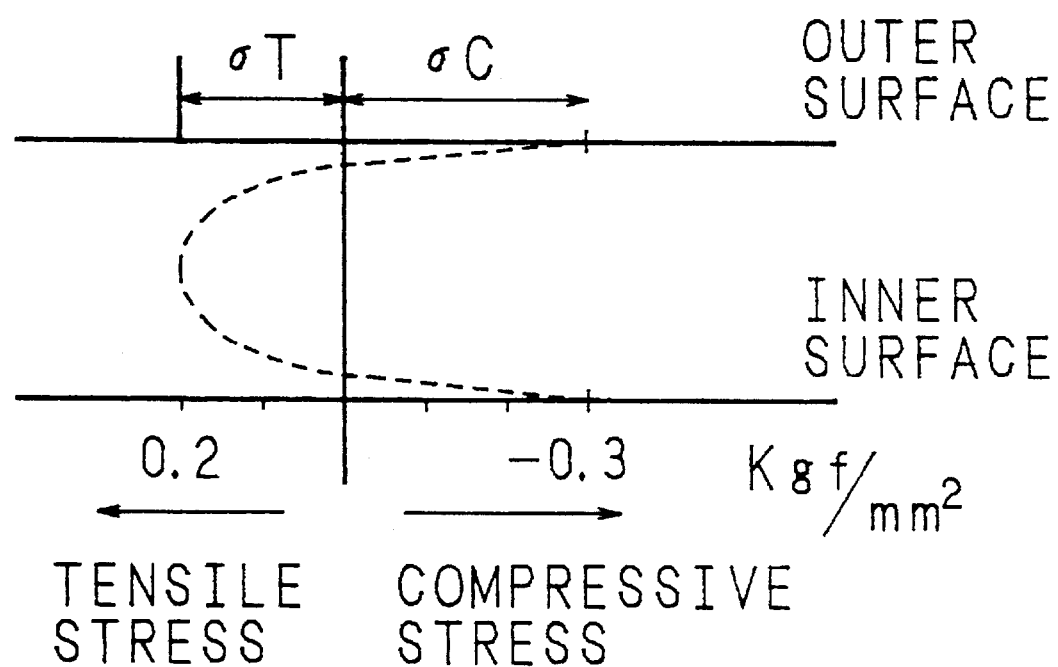
FIG. 16 is a schematic graph showing an example of preliminary reinforcement applied in the hatching area in FIG. 3 of, for example, a picture tube preliminarily reinforced by the manufacturing method of a picture tube of the invention, being a schematic graph showing the state of preliminary reinforcement to provide with $\sigma T=+0.18$ kgf/mm$^2$ and $\sigma C=-0.3$ kgf/mm$^2$.

FIG. 16 is a schematic graph showing an example of preliminary reinforcement applied at least to the hatched area in FIG. 3, in the condition of $\sigma T=+0.18$ kgf/mm$^2$, and $\sigma C=-0.3$ kgf/mm$^2$.

As described here in detail, according to the manufacturing method of a picture tube of the invention, especially for large-sized CRT or heavy-weighted CRT accompanying with flattening as the screen panel, it is possible to reduce in weight without sacrificing the reliability about the strength of the glass bulb for a long period, or the performance about scattering of broken glass pieces in the event of breakage of the bulb, and the cost may be lowered at the same time.

Moreover, increase of the wedge amount in the peripheral portions of the panel screen can be avoided, and the transmission rate on the screen panel is made uniform, and the amount of preliminary reinforcement is optimized on the outer surface and inner surface of the glass on the side face portion at the corners of the screen panel. Therefore adverse effects on the vicinity of the anode button and vicinity of the neck splice line of the funnel which is not uniform in distortion can be avoided, and moreover possibility of the glass being broken into small pieces is low even when the bulb is broken.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A manufacturing method of a picture tube, comprising the steps of:

forming a glass bulb comprising a panel portion, including a rectangular panel screen and a side face portion surrounding an outer periphery of the rectangular panel screen, a funnel portion connected to the side face portion of the panel portion and being sealed with an anode button, and a neck portion connected to the funnel portion;

physically reinforcing the glass bulb to increase tensile stress in a central portion of a wall of the panel portion and to increase compressive stress on an outer surface of the panel portion;

exhausting the inside of the glass bulb; and tightening the side face portion of the panel portion with a metal ring in order to prevent implosion.

2. A manufacturing method of a picture tube as set forth in claim 1, wherein said step of physical reinforcement is accomplished by an air cooling treatment.

3. A manufacturing method of a picture tube, comprising the steps of:

forming a glass bulb comprising a panel portion, including a rectangular panel screen and a side face portion surrounding an outer periphery of the rectangular panel screen, a funnel portion connected to the side face portion of the panel portion and being sealed with an anode button, and a neck portion connected to the funnel portion;

physically reinforcing the glass bulb to increase tensile stress in a central portion of a wall of the panel portion and to increase compressive stress on an outer surface of the panel portion, a difference between tensile stress and compressive stress further being relatively smaller near corners of the rectangular panel screen than in central portions of sides of the rectangular panel screen;

exhausting the inside of the glass bulb; and tightening the side face portion of the panel portion with a metal ring in order to prevent implosion.

4. A manufacturing method of a picture tube as set forth in claim 3, wherein said step of physical reinforcement is achieved by an air cooling treatment.

5. A manufacturing method of a picture tube, comprising the steps of:

forming a glass bulb comprising a panel portion, including a rectangular panel screen and a side face portion surrounding an outer periphery of the rectangular panel screen, a funnel portion connected to the side face portion of the panel portion and being sealed with an anode button, and a neck portion connected to the funnel portion;

physically reinforcing the glass bulb to increase tensile stress in a central portion of a wall of the panel portion and to increase compressive stress on an outer surface of the panel portion, compressive stress being gradually increased from a center of the panel portion to outer edges of the panel portion;

exhausting the inside of the glass bulb; and tightening the side face portion of the panel portion with a metal ring in order to prevent implosion.

6. A manufacturing method of a picture tube as set forth in claim 5, wherein said step of physical reinforcement is achieved by an air cooling treatment.

7. A manufacturing method of a picture tube comprising steps of:

forming a glass bulb comprising a panel portion, including a rectangular panel screen and a side face portion surrounding an outer periphery of the rectangular panel screen, a funnel portion connected to the side face portion of the panel portion and being sealed with an anode button, and a neck portion connected to the funnel portion;

physically reinforcing the glass bulb to increase tensile stress in a central portion of a wall of the panel portion and to increase compressive stress on an outer surface of the panel portion, magnitudes of the compressive stress of the outer surface of the panel portion and a compressive stress of the inner surface of the panel portion being different;

exhausting the inside of the glass bulb; and tightening the side face portion of the panel portion with a metal ring in order to prevent implosion.

8. A manufacturing method of a picture tube as set forth in claim 7, wherein said step of physical reinforcement is achieved by an air cooling treatment.

9. A manufacturing method of a picture tube as set forth in claim 7, wherein the compressive stress applied to the inside and outside of the glass bulb is different only in the side face portion of the corners of the panel portion, and the compressive stress applied to the outside of the glass bulb is smaller than that applied to the inside.

10. A manufacturing method of a picture tube, comprising the steps of:

forming a glass bulb comprising a panel portion, including a rectangular panel screen and a side face portion surrounding an outer periphery of the rectangular panel screen, a funnel portion connected to the side face portion of the panel portion and being sealed with an anode button, and a neck portion connected to the funnel portion;

physically reinforcing the glass bulb to increase tensile stress in a central portion of a wall of the panel portion and to increase compressive stress on an outer surface of the panel portion, physical reinforcement of the glass bulb being relatively smallest near the anode button;

exhausting the inside of the glass bulb; and tightening the side face portion of the panel portion with a metal ring in order to prevent implosion.

11. A manufacturing method of a picture tube as set forth in claim 10, wherein said step of physical reinforcement is achieved by an air cooling treatment.

12. A manufacturing method of a picture tube, comprising the steps of:

forming a glass bulb comprising a panel portion, including a rectangular panel screen and a side face portion surrounding an outer periphery of the rectangular panel screen, a funnel portion connect to the side face portion of the panel portion and being sealed with an anode button, and a neck portion connect to the funnel portion;

physically reinforcing the glass bulb to increase tensile stress in a central portion of a wall of the panel portion and to increase compressive stress on an outer surface of the panel portion, physical reinforcement of the glass bulb being relatively smallest along a connection portion between the funnel portion and the neck portion;

exhausting the inside of the glass bulb; and tightening the side face portion of the panel portion with a metal ring in order to prevent implosion.

13. A manufacturing method of a picture tube as set forth in claim 12, wherein said step of physical reinforcement is achieved by an air cooling treatment.

14. A manufacturing method of a picture tube, comprising the steps of:

forming a glass bulb comprising a panel portion, including a rectangular panel screen and a side face portion surrounding an outer periphery of the rectangular panel screen, a funnel portion connected to the side face portion of the panel portion and being sealed with an anode button, and a neck portion connected to the funnel portion;

exhausting the inside of the glass bulb;

physically reinforcing the glass bulb to increase tensile stress in a central portion of a wall of the panel portion and to increase compressive stress on an outer surface of the panel portion, an absolute value of compressive stress on an outer surface of the glass bulb where tensile stress in increased is relatively larger than tensile stress on an inner surface thereof; and tightening the side face portion of the panel portion with a metal ring in order to prevent implosion.

15. A manufacturing method of a picture tube as set forth in claim 14, wherein said step of physical reinforcement is achieved by an air cooling treatment.

* * * * *